US012764107B2

(12) United States Patent
Liu

(10) Patent No.: US 12,764,107 B2
(45) Date of Patent: Oct. 13, 2026

(54) IN-VEHICLE INFOTAINMENT APPLICATION LOGIN METHOD, APPARATUS/DEVICE, AND SYSTEM

(71) Applicant: Chongqing Changan Automobile Co Ltd, Chongqing (CN)

(72) Inventor: Daiwen Liu, Chongqing (CN)

( * ) Notice: Subject to any disclaimer, the term of this patent is extended or adjusted under 35 U.S.C. 154(b) by 373 days.

(21) Appl. No.: 18/427,828

(22) Filed: Jan. 31, 2024

(65) Prior Publication Data

US 2025/0071109 A1 Feb. 27, 2025

(30) Foreign Application Priority Data

Aug. 21, 2023 (CN) ......................... 202311054922.6

(51) Int. Cl.
*H04L 9/40* (2022.01)

(52) U.S. Cl.
CPC ................................ *H04L 63/0846* (2013.01)

(58) Field of Classification Search
CPC ............. H04L 63/0846; H04L 63/0838; H04L 63/0815; H04L 9/40; H04L 63/0876; H04W 4/44; H04W 12/069; H04W 4/48; H04W 12/06
See application file for complete search history.

(56) References Cited

U.S. PATENT DOCUMENTS

2015/0120402 A1* 4/2015 Ahmed .................. G06Q 30/06 705/13
2016/0216130 A1* 7/2016 Abramson ......... G01C 21/3423
2017/0279957 A1* 9/2017 Abramson et al. ...... G06F 21/36
2018/0091930 A1* 3/2018 Jefferies ............. G07C 9/00571
2019/0392367 A1* 12/2019 Gara ..................... G06Q 20/384
2022/0391489 A1* 12/2022 Cao ....................... H04W 12/06

FOREIGN PATENT DOCUMENTS

CN 105791388 B * 3/2019 ............... H04L 9/32
CN 115019421 A * 9/2022 .............. H04W 4/44
EP 3277010 A1 * 2/2018 ......... H04L 63/0869
WO WO-2022156443 A1 * 7/2022 ............ H04W 48/08
WO WO-2023231211 A1 * 12/2023 ............. G10L 15/22

* cited by examiner

*Primary Examiner* — Khalid M Almaghayreh
(74) *Attorney, Agent, or Firm* — JMB Davis Ben-David

(57) ABSTRACT

An in-vehicle infotainment application login method, apparatus/device, and system are involved, which relate to the field of automobile technologies. The method is applied to an in-vehicle infotainment, and includes: obtaining, by the in-vehicle infotainment, a first eigenvalue identity (ID) of a first medium after a user unlocks a vehicle through the first medium; sending a vehicle ID of the vehicle to a telematics service provider (TSP) platform, so that the TSP platform sends a target eigenvalue list to the in-vehicle infotainment based on the vehicle ID, the target eigenvalue list including a plurality of eigenvalue IDs bound to the vehicle and a temporary authorization code corresponding to each of the plurality of eigenvalue IDs; further, by the in-vehicle infotainment, obtaining the target eigenvalue list sent by the TSP platform, and determining a first temporary authorization code.

11 Claims, 9 Drawing Sheets

IN-VEHICLE INFOTAINMENT APPLICATION LOGIN METHOD, APPARATUS/DEVICE, AND SYSTEM

CROSS-REFERENCE TO RELATED APPLICATIONS

This application claims the benefit of priority Chinese Patent Application No. 202311054922.6, filed Aug. 21, 2023, and entitled "IN-VEHICLE INFOTAINMENT APPLICATION LOGIN METHOD, APPARATUS/DEVICE, AND SYSTEM". The entirety of the aforementioned application is incorporated herein by reference.

FIELD OF THE INVENTION

The present application relates to the field of automobile technologies, and in particular, to an in-vehicle infotainment application login method, apparatus/device, and system.

BACKGROUND OF THE INVENTION

An in-vehicle infotainment is short for an in-vehicle infotainment product installed in a vehicle. The in-vehicle infotainment can implement a function of information communication between a person and the vehicle and between the vehicle and the outside world. With the transition of the vehicle to electrification, cockpit entertainment applications are growing rapidly, and a user needs to log in to increasing applications. To improve user experience, login steps and logins of the user need to be reduced.

At present, in the related art, an account of the user logs in to the in-vehicle infotainment after the vehicle is unlocked through a specific medium (a Bluetooth key or a physical key). In this case, account data of the user needs to be stored in the in-vehicle infotainment, and the account and a password of the user are invoked for login. As a result, there is a specific leakage risk for the account of the user, and security of the account cannot be ensured.

SUMMARY OF THE INVENTION

One of objectives of the present application is to provide an in-vehicle infotainment application login method, apparatus/device, and system, to implement unconscious login to an in-vehicle infotainment application after a user unlocks a vehicle, so as to improve user experience in using the vehicle.

To achieve the foregoing objective, the following technical solutions are used in the present application.

According to a first aspect provided in the present application, an in-vehicle infotainment application login method is provided, which is applied to an in-vehicle infotainment. The in-vehicle infotainment is deployed in an in-vehicle infotainment application login system. The in-vehicle infotainment application login system further includes a telematics service provider (TSP) platform. The method includes: obtaining, by the in-vehicle infotainment, a first eigenvalue identity (ID) of a first medium after a user unlocks a vehicle through the first medium, the first medium being any one of a plurality of unlocking media for unlocking the vehicle; sending a vehicle ID of the vehicle to the TSP platform, so that the TSP platform sends a target eigenvalue list to the in-vehicle infotainment based on the vehicle ID, the target eigenvalue list including a plurality of eigenvalue IDs bound to the vehicle and a temporary authorization code corresponding to each of the plurality of eigenvalue IDs; further, by the in-vehicle infotainment, obtaining the target eigenvalue list sent by the TSP platform, and determining a first temporary authorization code, the first temporary authorization code being a temporary authorization code corresponding to the first eigenvalue ID; and performing login to an in-vehicle infotainment application of the vehicle based on the first eigenvalue ID and the first temporary authorization code.

According to the foregoing technical means, in the in-vehicle infotainment application login method provided in the present application, after the vehicle is unlocked by the user through a specific unlocking medium, the in-vehicle infotainment determines an eigenvalue ID corresponding to the unlocking medium, and obtains the target eigenvalue list corresponding to the vehicle from the TSP platform. When there is the eigenvalue ID corresponding to the unlocking medium in the target eigenvalue list, a temporary authorization code corresponding to the eigenvalue ID is obtained from the target eigenvalue list. Further, the obtained eigenvalue ID and the temporary authorization code are sent to the TSP platform. After the TSP platform successfully verifies the eigenvalue ID and the temporary authorization code again, login to the in-vehicle infotainment application is performed with an in-vehicle infotainment application account corresponding to the eigenvalue ID. In the present application, through verification of the eigenvalue ID by the in-vehicle infotainment and verification of the eigenvalue ID and the temporary authorization code by the TSP platform, unconscious login to the in-vehicle infotainment application is implemented after the user unlocks the vehicle, and security of logging in to the in-vehicle infotainment application is improved. In addition, an account and a password of the user are not cached in the in-vehicle infotainment, so that a problem of low security in unconscious login in the related art is further solved.

In a possible implementation, the determining, by the in-vehicle infotainment, a first temporary authorization code includes: verifying the first eigenvalue ID based on the plurality of eigenvalue IDs in the target eigenvalue list; and when the first eigenvalue ID passes verification with the plurality of eigenvalue IDs, determining the temporary authorization code corresponding to the first eigenvalue ID as the first temporary authorization code.

According to the foregoing technical means, the present application provides a method for determining a temporary authorization code for login. Leakage of login information is avoided through further verification at the in-vehicle infotainment.

In a possible implementation, the performing, by the in-vehicle infotainment, an in-vehicle infotainment application of the vehicle based on the first eigenvalue ID and the first temporary authorization code includes: sending the first eigenvalue ID and the first temporary authorization code to the TSP platform, so that the TSP platform verifies the first temporary authorization code, and after the first temporary authorization code passes verification, returns a login token of an in-vehicle infotainment application account bound to the first eigenvalue ID; and performing login to the in-vehicle infotainment application of the vehicle in response to the login token sent by the TSP platform.

According to the foregoing technical means, the present application provides an implementation of unconscious login to the in-vehicle infotainment application based on the first eigenvalue ID and the first temporary authorization code.

In a possible implementation, the method further includes: determining a second eigenvalue ID of a second medium in response to a binding operation on the second medium, the second medium being any unlocking medium that is not bound to an in-vehicle infotainment application account of the user; and sending the second eigenvalue ID and an in-vehicle infotainment application account ID to the TSP platform, so that the TSP platform establishes a mapping relationship between the second eigenvalue ID and the in-vehicle infotainment application account ID, and signs and issues a second temporary authorization code.

According to the foregoing technical means, in the present application, binding between the in-vehicle infotainment application account and the eigenvalue ID is implemented at the TSP platform, so that support is provided for implementing unconscious login to the in-vehicle infotainment application after the user unlocks the vehicle, and user experience is ensured.

In a possible implementation, the in-vehicle infotainment application login system further includes a server of a third-party application. The in-vehicle infotainment application login method further includes: receiving a third-party application binding request initiated by the user, the third-party application binding request including the in-vehicle infotainment application account of the user, a third-party application account, and a third-party application ID; and after the third-party application account logs in to the third-party application, sending the third-party application binding request to the server of the third-party application, so that the server of the third-party application establishes a mapping relationship between the in-vehicle infotainment application account of the user and the third-party application account.

According to the foregoing technical means, in the present application, binding of the third-party application is implemented, so that support is provided for implementing synchronous login to the associated third-party application after login to the in-vehicle infotainment application, and user experience is ensured.

In a possible implementation, after the performing, by the in-vehicle infotainment, login to an in-vehicle infotainment application of the vehicle based on the first eigenvalue ID and the first temporary authorization code, the in-vehicle infotainment application login method further includes: obtaining a third-party application list bound to the in-vehicle infotainment application account of the user; and sending a login notification to a server of each third-party application in the third-party application list, so that the server of each third-party application performs login with a third-party application account of the user.

According to the foregoing technical means, in the present application, automatic login to the third-party application associated with the in-vehicle infotainment application account is implemented after login to the in-vehicle infotainment application, so that user experience is improved. In addition, the third-party application account is not cached at the in-vehicle infotainment, so that security of sensitive information of the user is ensured.

According to a second aspect provided in the present application, an in-vehicle infotainment application login method is provided, which is applied to a TSP platform. The TSP platform is deployed in an in-vehicle infotainment application login system. The in-vehicle infotainment application login system further includes an in-vehicle infotainment disposed in a vehicle. The method includes: determining, by the TSP platform, a target eigenvalue list in response to a vehicle ID sent by the in-vehicle infotainment, the target eigenvalue list including a plurality of eigenvalue IDs bound to the vehicle and a temporary authorization code corresponding to each of the plurality of eigenvalue IDs; sending the target eigenvalue list to the in-vehicle infotainment, so that the in-vehicle infotainment determines a first temporary authorization code, the first temporary authorization code being a temporary authorization code corresponding to a first eigenvalue ID, and the first eigenvalue ID being an eigenvalue ID of a first medium obtained after a user unlocks the vehicle through the first medium; further, verifying, by the TSP platform, the first temporary authorization code in response to the first eigenvalue ID and the first temporary authorization code that are sent by the in-vehicle infotainment; and when the first temporary authorization code passes verification, sending a login token of an in-vehicle infotainment application account bound to the first eigenvalue ID to the in-vehicle infotainment, so that the in-vehicle infotainment performs login to an in-vehicle infotainment application of the vehicle based on the login token.

In a possible implementation, the verifying, by the TSP platform, the first temporary authorization code further includes: determining whether the first temporary authorization code expires; and when the first temporary authorization code does not expire, determining that the first temporary authorization code passes authorization.

In a possible implementation, the in-vehicle infotainment application login method further includes: in response to a second eigenvalue ID and an in-vehicle application account ID of the user that are sent by the in-vehicle infotainment, establishing a mapping relationship between the second eigenvalue ID and the in-vehicle infotainment application account ID, and signing and issuing a second temporary authorization code, the second eigenvalue ID being an eigenvalue ID of a second medium, and the second medium being any unlocking medium that is not bound to the in-vehicle infotainment application account of the user; and updating the target eigenvalue list based on the second eigenvalue ID and the second temporary authorization code.

According to a third aspect provided in the present application, an in-vehicle infotainment application login system is provided, which includes an in-vehicle infotainment disposed in a vehicle and a TSP platform. The in-vehicle infotainment is configured to obtain a first eigenvalue ID of a first medium after a user unlocks the vehicle through the first medium. The first medium is any one of a plurality of unlocking media for unlocking the vehicle. The in-vehicle infotainment is further configured to send a vehicle ID of the vehicle to the TSP platform. The TSP platform is configured to determine a target eigenvalue list in response to the vehicle ID sent by the in-vehicle infotainment. The target eigenvalue list includes a plurality of eigenvalue IDs bound to the vehicle and a temporary authorization code corresponding to each of the plurality of eigenvalue IDs. The TSP platform is further configured to send the target eigenvalue list to the in-vehicle infotainment. The in-vehicle infotainment is further configured to determine a first temporary authorization code in response to the target eigenvalue list sent by the TSP platform. The first temporary authorization code is a temporary authorization code corresponding to the first eigenvalue ID. The in-vehicle infotainment is further configured to send the first eigenvalue ID and the first temporary authorization code to the TSP platform. The TSP platform is further configured to verify the first temporary authorization code in response to the first eigenvalue ID and the first temporary authorization code that are sent by the in-vehicle infotainment. The TSP platform is further configured to: when the first temporary authorization code passes verification, send a login token of an in-vehicle infotainment application account bound to the first eigenvalue ID to the in-vehicle infotainment. The in-vehicle infotainment is further configured to perform login to an in-vehicle infotainment application of the vehicle in response to the login token sent by the TSP platform.

According to a fourth aspect provided in the present application, an in-vehicle infotainment application login apparatus is provided, which is deployed in an in-vehicle infotainment. The in-vehicle infotainment is deployed in an in-vehicle infotainment application login system. The in-vehicle infotainment application login system further includes a TSP platform. The in-vehicle infotainment application login apparatus includes an obtaining unit, a sending unit, a determining unit, and a processing unit. The obtaining unit is configured to obtain a first eigenvalue ID of a first medium after a user unlocks a vehicle through the first medium. The first medium is any one of a plurality of unlocking media for unlocking the vehicle. The sending unit is configured to send a vehicle ID of the vehicle to the TSP platform, so that the TSP platform sends a target eigenvalue list to the in-vehicle infotainment based on the vehicle ID. The target eigenvalue list includes a plurality of eigenvalue IDs bound to the vehicle and a temporary authorization code corresponding to each of the plurality of eigenvalue IDs. The obtaining unit is further configured to obtain the target eigenvalue list sent by the TSP platform. The determining unit is configured to determine a first temporary authorization code. The first temporary authorization code is a temporary authorization code corresponding to the first eigenvalue ID. The processing unit is configured to perform login to an in-vehicle infotainment application of the vehicle based on the first eigenvalue ID and the first temporary authorization code.

In a possible implementation, the determining unit is specifically configured to: verify the first eigenvalue ID based on the plurality of eigenvalue IDs in the target eigenvalue list; and when the first eigenvalue ID passes verification with the plurality of eigenvalue IDs, determine the temporary authorization code corresponding to the first eigenvalue ID as the first temporary authorization code.

In a possible implementation, the processing unit is specifically configured to: send the first eigenvalue ID and the first temporary authorization code to the TSP platform, so that the TSP platform verifies the first temporary authorization code, and after the first temporary authorization code passes verification, returns a login token of an in-vehicle infotainment application account bound to the first eigenvalue ID; and perform login to the in-vehicle infotainment application of the vehicle in response to the login token sent by the TSP platform.

In a possible implementation, the determining unit is further configured to determine a second eigenvalue ID of a second medium in response to a binding operation on the second medium. The second medium is any unlocking medium that is not bound to the in-vehicle infotainment application account of the user. The sending unit is further configured to send the second eigenvalue ID and an in-vehicle infotainment application account ID to the TSP platform, so that the TSP platform establishes a mapping relationship between the second eigenvalue ID and the in-vehicle infotainment application account ID, and signs and issues a second temporary authorization code.

In a possible implementation, the obtaining unit is further configured to receive a third-party application binding request initiated by the user. The third-party application binding request includes the in-vehicle infotainment application account of the user, a third-party application account, and a third-party application ID. The sending unit is further configured to: after the third-party application account logs in to a third-party application, send the third-party application binding request to a server of the third-party application, so that the server of the third-party application establishes a mapping relationship between the in-vehicle infotainment application account of the user and the third-party application account.

In a possible implementation, the obtaining unit is further configured to obtain a third-party application list bound to the in-vehicle infotainment application account of the user. The sending unit is further configured to send a login notification to a server of each third-party application in the third-party application list, so that the server of each third-party application performs login with a third-party application account of the user.

According to a fifth aspect provided in the present application, an in-vehicle infotainment application login apparatus is provided, which is deployed in a TSP platform. The TSP platform is deployed in an in-vehicle infotainment application login system. The in-vehicle infotainment application login system further includes an in-vehicle infotainment disposed in a vehicle. The in-vehicle infotainment application login apparatus includes a determining unit, a sending unit, and a processing unit. The determining unit is configured to determine a target eigenvalue list in response to a vehicle ID sent by the in-vehicle infotainment. The target eigenvalue list includes a plurality of eigenvalue IDs bound to the vehicle and a temporary authorization code corresponding to each of the plurality of eigenvalue IDs. The sending unit is configured to send the target eigenvalue list to the in-vehicle infotainment, so that the in-vehicle infotainment determines a first temporary authorization code. The first temporary authorization code is a temporary authorization code corresponding to a first eigenvalue ID. The first eigenvalue ID is an eigenvalue ID of a first medium obtained after a user unlocks the vehicle through the first medium. The processing unit is configured to verify the first temporary authorization code in response to the first eigenvalue ID and the first temporary authorization code that are sent by the in-vehicle infotainment. The sending unit is further configured to: when the first temporary authorization code passes verification, send a login token of an in-vehicle infotainment application account bound to the first eigenvalue ID to the in-vehicle infotainment, so that the in-vehicle infotainment performs login to an in-vehicle infotainment application of the vehicle based on the login token.

In a possible implementation, the processing unit is specifically configured to: determine whether the first temporary authorization code expires; and when the first temporary authorization code does not expire, determine that the first temporary authorization code passes authorization.

In a possible implementation, the processing unit is further configured to: in response to a second eigenvalue ID and an in-vehicle application account ID of the user that are sent by the in-vehicle infotainment, establish a mapping relationship between the second eigenvalue ID and the in-vehicle infotainment application account ID, and sign and issue a second temporary authorization code, the second eigenvalue ID being an eigenvalue ID of a second medium, and the second medium being any unlocking medium that is not bound to the in-vehicle infotainment application account of the user; and update the target eigenvalue list based on the second eigenvalue ID and the second temporary authorization code.

According to a sixth aspect provided in the present application, an in-vehicle infotainment is provided, which is deployed in a vehicle. The in-vehicle infotainment includes a memory and a processor. The memory is coupled to the processor. The memory is configured to store computer program code. The computer program code includes computer instructions. When the processor executes the computer instructions, the in-vehicle infotainment is enabled to perform the in-vehicle infotainment application login method provided in the first aspect and any possible implementation of the first aspect.

According to a seventh aspect provided in the present application, a computer-readable storage medium is provided. Instructions are stored in the computer-readable storage medium. When the instructions run on an in-vehicle infotainment, the in-vehicle infotainment is enabled to perform the in-vehicle infotainment application login method provided in the first aspect and any possible implementation of the first aspect.

According to an eighth aspect provided in the present application, a computer program product is provided, which includes computer instructions. When the computer instructions run on an in-vehicle infotainment, the in-vehicle infotainment is enabled to perform the in-vehicle infotainment application login method provided in the first aspect and any possible implementation of the first aspect.

According to a ninth aspect provided in the present application, a vehicle is provided, which includes the in-vehicle infotainment provided in the sixth aspect.

Therefore, the foregoing technical features of the present application have the following beneficial effects.

(1) In the in-vehicle infotainment application login method provided in the present application, after the vehicle is unlocked by the user through a specific unlocking medium, the in-vehicle infotainment determines an eigenvalue ID corresponding to the unlocking medium, and obtains the target eigenvalue list corresponding to the vehicle from the TSP platform. When there is the eigenvalue ID corresponding to the unlocking medium in the target eigenvalue list, a temporary authorization code corresponding to the eigenvalue ID is obtained from the target eigenvalue list. Further, the obtained eigenvalue ID and the temporary authorization code are sent to the TSP platform. After the TSP platform successfully verifies the eigenvalue ID and the temporary authorization code again, login to the in-vehicle infotainment application is performed with an in-vehicle infotainment application account corresponding to the eigenvalue ID. In the present application, through verification of the eigenvalue ID by the in-vehicle infotainment and verification of the eigenvalue ID and the temporary authorization code by the TSP platform, unconscious login to the in-vehicle infotainment application is implemented after the user unlocks the vehicle, and security of logging in to the in-vehicle infotainment application is improved. In addition, an account and a password of the user are not cached in the in-vehicle infotainment, so that a problem of low security in unconscious login in the related art is further solved.

(2) In the present application, binding between the eigenvalue ID and the in-vehicle infotainment application account is implemented at the TSP platform, to determine the in-vehicle infotainment application account corresponding to the unlocking medium when the vehicle is unlocked again with the unlocking medium, so that unconscious login to the in-vehicle infotainment application is implemented.

(3) In the present application, binding of the third-party application is implemented, and automatic login to the third-party application associated with the in-vehicle infotainment application account is implemented after login to the in-vehicle infotainment application, so that user experience is improved. In addition, the third-party application account is not cached at the in-vehicle infotainment, so that security of sensitive information of the user is ensured.

It should be noted that for technical effects brought by any implementation in the second aspect to the ninth aspect, refer to technical effects brought by corresponding implementations in the first aspect. Details are not described again herein.

It should be understood that the foregoing general descriptions and the following detailed descriptions are merely exemplary and explanative, and do not constitute any limitation on the present application.

DETAILED DESCRIPTION OF THE EMBODIMENTS

The following describes implementations of the present application with reference to the accompanying drawings and preferred embodiments. A person skilled in the art may easily learn other advantages and effects of the present application based on content disclosed in this specification. The present application may further be implemented or applied with other different specific implementations. Various modifications or variations may further be made to details in this specification based on different points of view and applications without departing from the spirit of the present application. It should be understood that preferred embodiments are merely intended to illustrate the present application but not to limit the protection scope of the present application.

It should be noted that the drawings provided in the following embodiments merely schematically describe the basic concept of the present application. Therefore, the drawings show only components related to the present application, but are not drawn based on the number, a shape, and a size of a component during actual implementation. During actual implementation, a form, the number, and a scale of each component can change freely, and a layout form of the component may also be more complex.

In the descriptions about embodiments, "/" means "or", unless otherwise stated. For example, A/B may represent A or B. The term "and/or" herein describes only an association relationship for describing associated objects and represents that three relationships may exist. For example, A and/or B may represent the following three cases: only A exists, both A and B exist, and only B exists. Moreover, "at least one" means one or more, and "a plurality of" means two or more. Words such as "first" and "second" do not limit a quantity and an execution order, and the words "first" and "second" are not necessarily different.

At present, with the transition of a vehicle to electrification, cockpit entertainment applications are growing rapidly, and a user needs to log in to increasing applications. To improve user experience, login steps and logins of the user need to be reduced. In the related art, an account of the user logs in to an in-vehicle infotainment after the vehicle is unlocked through a specific medium (a Bluetooth key or a physical key). In this case, account data of the user needs to be stored in the in-vehicle infotainment, and the account and a password of the user are invoked for login. As a result, there is a specific leakage risk for the account of the user, and security of the account cannot be ensured.

Figure 1:
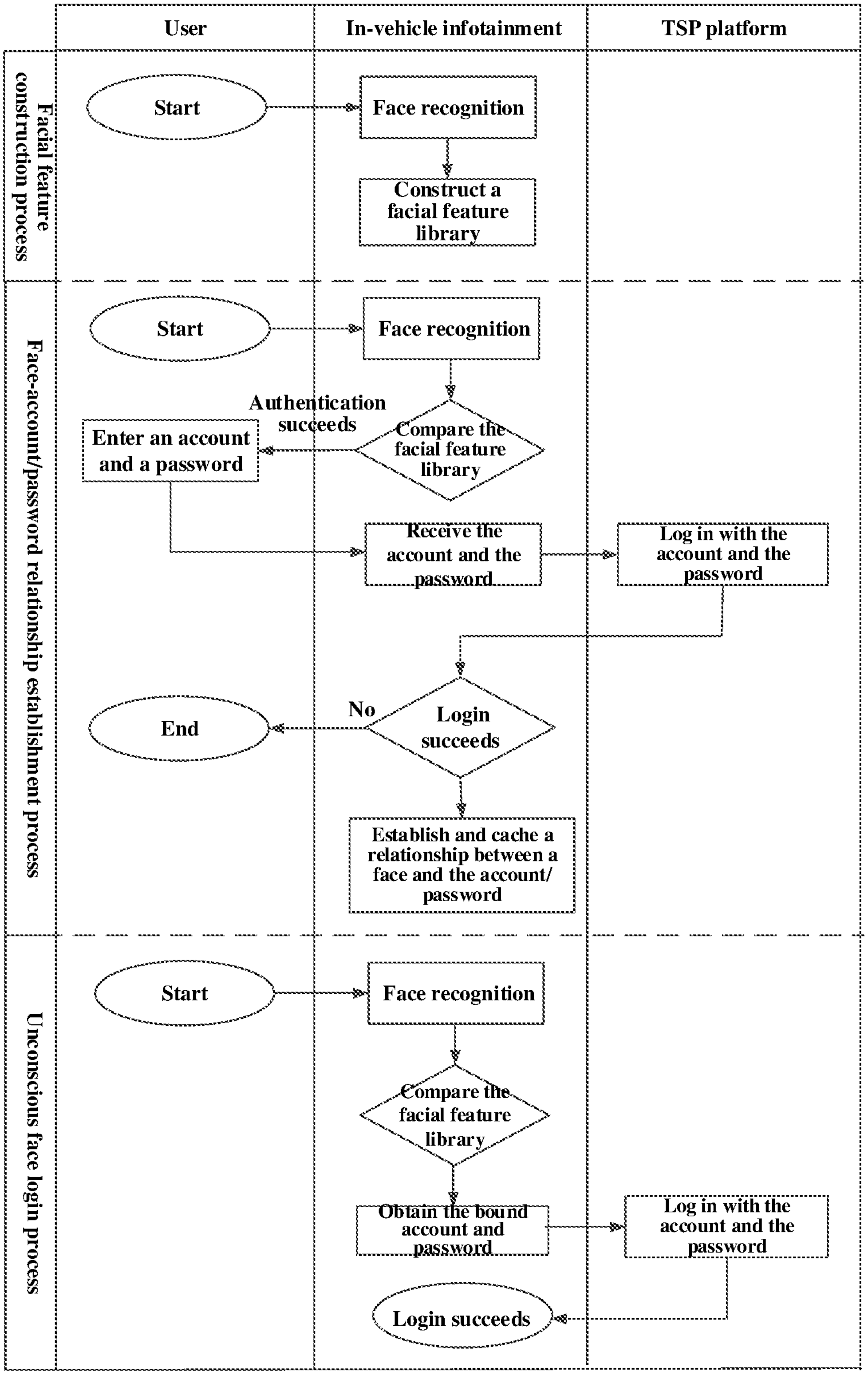
Fig. 1 (Prior Art)
FIG. 1 is a flowchart of an in-vehicle infotainment application login method according to an exemplary embodiment.

For example, FIG. 1 is a flowchart of a method for implementing unconscious login to an in-vehicle infotainment application based on face recognition according to the related art. The method includes a facial feature construction process, a face-account/password relationship establishment process, and an unconscious face login process. In the facial feature construction process, a user performs face recognition through an in-vehicle infotainment, and the in-vehicle infotainment further constructs a facial feature library based on a recognized face. In the face-account/password relationship establishment process, the user first performs face recognition. The in-vehicle infotainment compares a recognized face with the facial feature library. When authentication succeeds, an entry is provided for the user to enter an account and a password, and the account and the password that are entered by the user are received for login at a TSP platform. When login succeeds, a relationship between the face and the account/password is established and cached in the in-vehicle infotainment. In the unconscious face login process, the user performs face recognition through the in-vehicle infotainment. The in-vehicle infotainment compares a recognized face with the facial feature library, and when authentication succeeds, invokes a bound account and password from a cache of the in-vehicle infotainment for login at the TSP platform.

It may be understood that in the related art, unconscious login is implemented only when an unlocking medium implements face recognition unlocking. At present, due to the transition of a vehicle to electrification, various unlocking media (for example, face recognition, a Bluetooth key, and an NFC key) are available for the user to unlock the vehicle. If an independent process is set for each medium, high access and development costs are brought.

In addition, since sensitive information (the account and the password) of the user is stored in the cache of the in-vehicle infotainment, there is a high leakage risk, and a great security problem is likely to occur.

To solve the foregoing technical problem, the present application proposes an in-vehicle infotainment application login method, which is applied to an in-vehicle infotainment. The in-vehicle infotainment is deployed in an in-vehicle infotainment application login system. The in-vehicle infotainment application login system further includes a TSP platform. The method includes that: the in-vehicle infotainment obtains a first eigenvalue ID of a first medium after a user unlocks a vehicle through the first medium, the first medium being any one of a plurality of unlocking media for unlocking the vehicle; a vehicle ID of the vehicle is sent to the TSP platform, so that the TSP platform sends a target eigenvalue list to the in-vehicle infotainment based on the vehicle ID, the target eigenvalue list including a plurality of eigenvalue IDs bound to the vehicle and a temporary authorization code corresponding to each of the plurality of eigenvalue IDs; further, the in-vehicle infotainment obtains the target eigenvalue list sent by the TSP platform, and determines a first temporary authorization code, the first temporary authorization code being a temporary authorization code corresponding to the first eigenvalue ID; and login to an in-vehicle infotainment application of the vehicle is performed based on the first eigenvalue ID and the first temporary authorization code.

In this way, in the in-vehicle infotainment application login method provided in the present application, after the vehicle is unlocked by the user through a specific unlocking medium, the in-vehicle infotainment determines an eigenvalue ID corresponding to the unlocking medium, and obtains the target eigenvalue list corresponding to the vehicle from the TSP platform. When there is the eigenvalue ID corresponding to the unlocking medium in the target eigenvalue list, a temporary authorization code corresponding to the eigenvalue ID is obtained from the target eigenvalue list. Further, the obtained eigenvalue ID and the temporary authorization code are sent to the TSP platform. After the TSP platform successfully verifies the eigenvalue ID and the temporary authorization code again, login to the in-vehicle infotainment application is performed with an in-vehicle infotainment application account corresponding to the eigenvalue ID. In the present application, through verification of the eigenvalue ID by the in-vehicle infotainment and verification of the eigenvalue ID and the temporary authorization code by the TSP platform, unconscious login to the in-vehicle infotainment application is implemented after the user unlocks the vehicle, and security of logging in to the in-vehicle infotainment application is improved. In addition, an account and a password of the user are not cached in the in-vehicle infotainment, so that a problem of low security in unconscious login in the related art is further solved.

Figure 2:
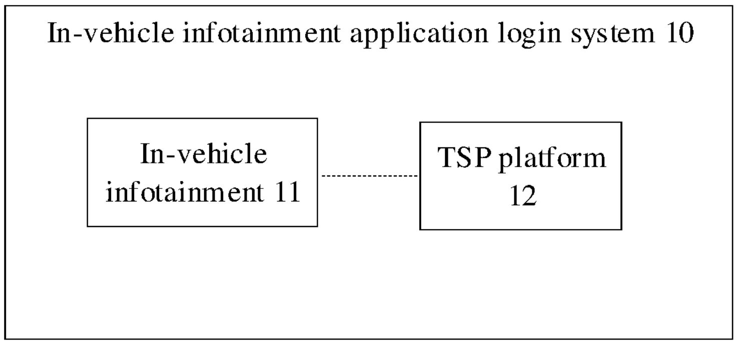
FIG. 2 is a schematic diagram of a structure of an in-vehicle infotainment application login system according to an exemplary embodiment.

FIG. 2 shows an in-vehicle infotainment application login system. The in-vehicle infotainment application login method provided in the embodiments of the present application may be applied to the in-vehicle infotainment application login system shown in FIG. 2, to implement unconscious login to the in-vehicle infotainment application after the user unlocks the vehicle, so as to improve user experience in using the vehicle. As shown in FIG. 2, the in-vehicle infotainment application login system 10 includes an in-vehicle infotainment 11 and a TSP platform 12.

The in-vehicle infotainment 11 communicates with the TSP platform 12 through a wireless connection. The in-vehicle infotainment 11 is disposed in a vehicle.

The in-vehicle infotainment 11 is configured to obtain a first eigenvalue ID of a first medium after a user unlocks the vehicle through the first medium.

The first medium is any one of a plurality of unlocking media for unlocking the vehicle. For example, the first medium may be any one of unlocking media such as face recognition, a Bluetooth key, and an NFC key.

The in-vehicle infotainment 11 is further configured to send a vehicle ID of the vehicle to the TSP platform 12.

The TSP platform 12 is configured to determine a target eigenvalue list in response to the vehicle ID sent by the in-vehicle infotainment 11.

The target eigenvalue list includes a plurality of eigenvalue IDs bound to the vehicle and a temporary authorization code corresponding to each of the plurality of eigenvalue IDs.

The TSP platform 12 is further configured to send the target eigenvalue list to the in-vehicle infotainment 11.

The in-vehicle infotainment 11 is further configured to determine a first temporary authorization code in response to the target eigenvalue list sent by the TSP platform 12.

The first temporary authorization code is a temporary authorization code corresponding to the first eigenvalue ID.

The in-vehicle infotainment 11 is further configured to send the first eigenvalue ID and the first temporary authorization code to the TSP platform 12.

The TSP platform 12 is further configured to: verify the first temporary authorization code in response to the first eigenvalue ID and the first temporary authorization code that are sent by the in-vehicle infotainment 11; and when the first temporary authorization code passes verification, send a login token of an in-vehicle infotainment application account bound to the first eigenvalue ID to the in-vehicle infotainment 11.

The in-vehicle infotainment 11 performs login to the in-vehicle infotainment application of the vehicle in response to the login token sent by the TSP platform 12.

In some embodiments, the in-vehicle infotainment is further wirelessly connected to a server of a third-party application, and establishes a mapping relationship between the in-vehicle infotainment application account and a third-party application account, so that the in-vehicle infotainment logs in to the third-party application based on the third-party application account having the mapping relationship with the in-vehicle infotainment application account after logging in to the in-vehicle infotainment application based on the in-vehicle infotainment application account.

Figure 3:
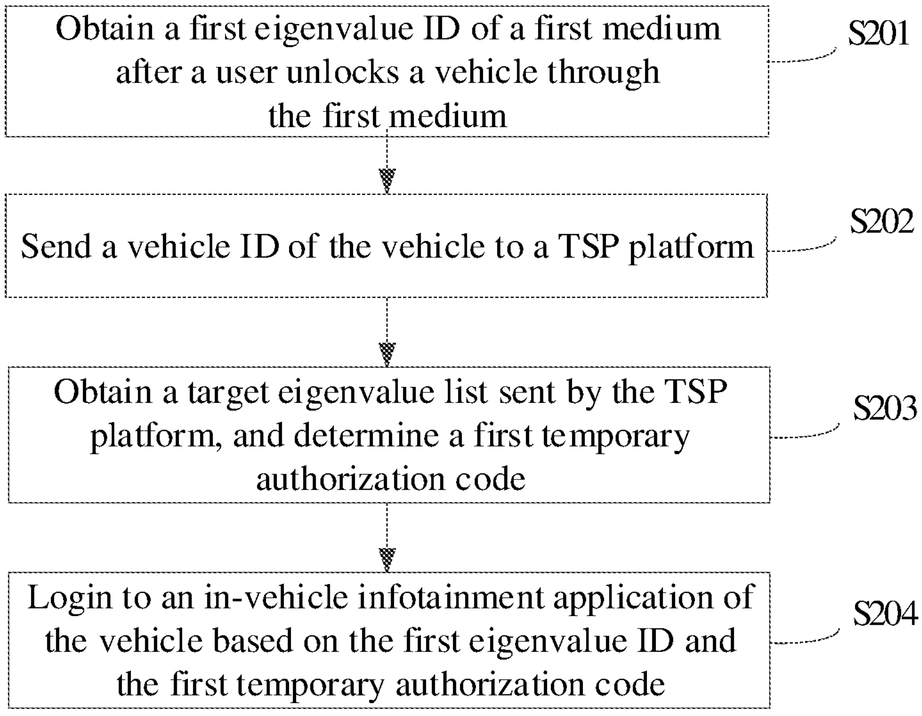
FIG. 3 is a flowchart of still another in-vehicle infotainment application login method according to an exemplary embodiment.

FIG. 3 is a schematic flowchart of an in-vehicle infotainment application login method according to some exemplary embodiments. In some embodiments, the in-vehicle infotainment application login method may be applied to the in-vehicle infotainment 11 in the in-vehicle infotainment application login system 10 shown in FIG. 2. The following describes the in-vehicle infotainment application login method in the embodiments of the present application by taking application of the in-vehicle infotainment application login method to the in-vehicle infotainment 11 as an example.

As shown in FIG. 3, the in-vehicle infotainment application login method provided in the embodiments of the present application includes the following S201 to S204.

In S201, the in-vehicle infotainment obtains a first eigenvalue ID of a first medium after a user unlocks a vehicle through the first medium.

The first medium is any one of a plurality of unlocking media for unlocking the vehicle.

As a possible implementation, after the user unlocks the vehicle through the first medium, the in-vehicle infotainment obtains unlocking data about unlocking of the vehicle through the first medium based on a recognition module corresponding to the first medium, and further determines the first eigenvalue ID of the first medium based on a preset algorithm and the unlocking data.

For example, the first medium may be any one of unlocking media such as face recognition, a Bluetooth key, and an NFC key. When the first medium is face recognition, the recognition module corresponding to the first medium is a camera for face recognition. When the first medium is the Bluetooth key, the recognition module corresponding to the first medium is a Bluetooth module of the vehicle. When the first medium is the NFC key, the recognition module corresponding to the first medium is an NFC sensing module.

It may be understood that different unlocking media implement unlocking based on data transmitted by the unlocking media to the vehicle. Therefore, the in-vehicle infotainment performs calculation based on the data transmitted to the vehicle and the preset algorithm, and further determines an obtained calculation result as an eigenvalue ID corresponding to the unlocking medium.

It should be noted that the preset algorithm may be preset in the in-vehicle infotainment by operation and maintenance staff of the in-vehicle infotainment application login system. For example, the preset algorithm may be a principal component analysis (PCA) algorithm, a linear discriminant analysis (LDA) algorithm, or another feature extraction algorithm. This is not specifically limited in the embodiments of the present application.

In S202, the in-vehicle infotainment sends a vehicle ID of the vehicle to the TSP platform.

Correspondingly, the TSP platform receives the vehicle ID of the vehicle sent by the in-vehicle infotainment, and sends a target eigenvalue list to the in-vehicle infotainment based on the vehicle ID.

The vehicle ID of the vehicle may be a vehicle identification number (VIN) of the vehicle. The target eigenvalue list includes a plurality of eigenvalue IDs bound to the vehicle and a temporary authorization code corresponding to each of the plurality of eigenvalue IDs.

For example, the target eigenvalue list is as shown in the following Table 1.

TABLE 1

In Table 1, for example, the eigenvalue ID “eigenvalue A” may be 98bea9445db9992e4b5d16da, the temporary authorization code “xcodeA” may be 5a7a86e0529d4354a9dbeaa065e8852b, and the eigenvalue type “face recognition” may be FACEID.

Target eigenvalue list

| Vehicle ID | Eigenvalue ID | Temporary authorization code | Time limit of the temporary authorization code | Eigenvalue type |
|---|---|---|---|---|
| VINA | Eigenvalue A | xcodeA | 3600 | Face recognition |
| | Eigenvalue | xcodeB | 3000 | Bluetooth |

TABLE 1-continued

In Table 1, for example, the eigenvalue ID "eigenvalue A" may be 98bea9445db9992e4b5d16da, the temporary authorization code "xcodeA" may be 5a7a86e0529d4354a9dbeaa065e8852b, and the eigenvalue type "face recognition" may be FACEID.

Target eigenvalue list

| Vehicle ID | Eigenvalue ID | Temporary authorization code | Time limit of the temporary authorization code | Eigenvalue type |
|---|---|---|---|---|
| | B Eigenvalue C | xcodeC | 3600 | key NFC key |

In some embodiments, to ensure higher in-vehicle infotainment application login security, the TSP platform further encrypts, based on a preset encryption algorithm, the temporary authorization code in the eigenvalue list delivered by the TSP platform.

For example, a data statement returned by the TSP platform is as follows.

```
{
  "status_code": 0,
  "data": [{
    "featureId": 5dba4f0bbbc3c70008a832d4",//eigenvalue id
    "xcode": "5a7a86e0529d4354a9dbeaa065e8852b",//user authorization
code for login
    "secretKey": "NGJmNjU3ZDA3NzViNDVmZA == ",
    //temporary authorization code key, for subsequent related interface
signature and encryption of the temporary authorization code. The temporary
authorization codes are in one-to-one correspondence and consistent in period of
validity
    "expiresIn": 3600,   //time limit of the temporary authorization code
    "serialNum":   "74515d96c63a4db49f7abf513fac0487",   //   serial
number/identifier
    "featureType": "FACEID"//eigenvalue type
  },
  {
    "featureId": " 5ea2d3c2af7074000702debf",
    "xcode": "7d41ea87f8d74329b69918fd7e1c729e",
    "secretKey": "NGJmNfsd4SdsSDsFxfgNzViNDVmZA == ",
    "expiresIn": 3600,
    "serialNum": "de5e58fbc74341778e8e981b41b38ad0",
    "featureType":"NFC"
  }]
}
```

In S203, the in-vehicle infotainment obtains the target eigenvalue list sent by the TSP platform, and determines a first temporary authorization code.

The first temporary authorization code is a temporary authorization code corresponding to the first eigenvalue ID.

As a possible implementation, the in-vehicle infotainment determines the plurality of eigenvalue IDs included in the target eigenvalue list in response to the target eigenvalue list sent by the TSP platform, and further verifies the first eigenvalue ID based on the plurality of eigenvalue IDs included in the target eigenvalue list. Further, when determining that the plurality of eigenvalue IDs include the first eigenvalue ID, the in-vehicle infotainment determines that the first eigenvalue ID passes verification. Moreover, the in-vehicle infotainment determines the temporary authorization code that is in the target eigenvalue list and that corresponds to the first eigenvalue ID as the first temporary authorization code.

For example, the target eigenvalue list shown in Table 1 is the target eigenvalue list obtained by the in-vehicle infotainment. If the first eigenvalue ID is the eigenvalue C, it is determined that the first eigenvalue ID passes verification, and xcodeC corresponding to the eigenvalue C is determined as the first temporary authorization code.

In S204, the in-vehicle infotainment performs login to an in-vehicle infotainment application of the vehicle based on the first eigenvalue ID and the first temporary authorization code.

As a possible implementation, after determining the first temporary authorization code based on step S203, the in-vehicle infotainment sends the first eigenvalue ID and the first temporary authorization code to the TSP platform, so that the TSP platform verifies the first temporary authorization code. After the first temporary authorization code passes verification, login to the in-vehicle infotainment application of the vehicle is performed based on an in-vehicle infotainment application account bound to the first eigenvalue ID.

As another possible implementation, after determining the first temporary authorization code based on step S203, the in-vehicle infotainment sends the first eigenvalue ID and the first temporary authorization code to the TSP platform.

Correspondingly, the TSP platform receives the first eigenvalue ID and the first temporary authorization code that are sent by the in-vehicle infotainment, performs expiration checking on the first temporary authorization code to determine whether the first temporary authorization code expires, and if the first temporary authorization code does not expire, determines that the first temporary authorization code passes verification. Further, a login token of an in-vehicle infotainment application account bound to the first eigenvalue ID is determined, and the login token is sent to the in-vehicle infotainment.

Correspondingly, the in-vehicle infotainment performs login to the in-vehicle infotainment application of the vehicle based on the login token sent by the TSP platform.

Figure 4:
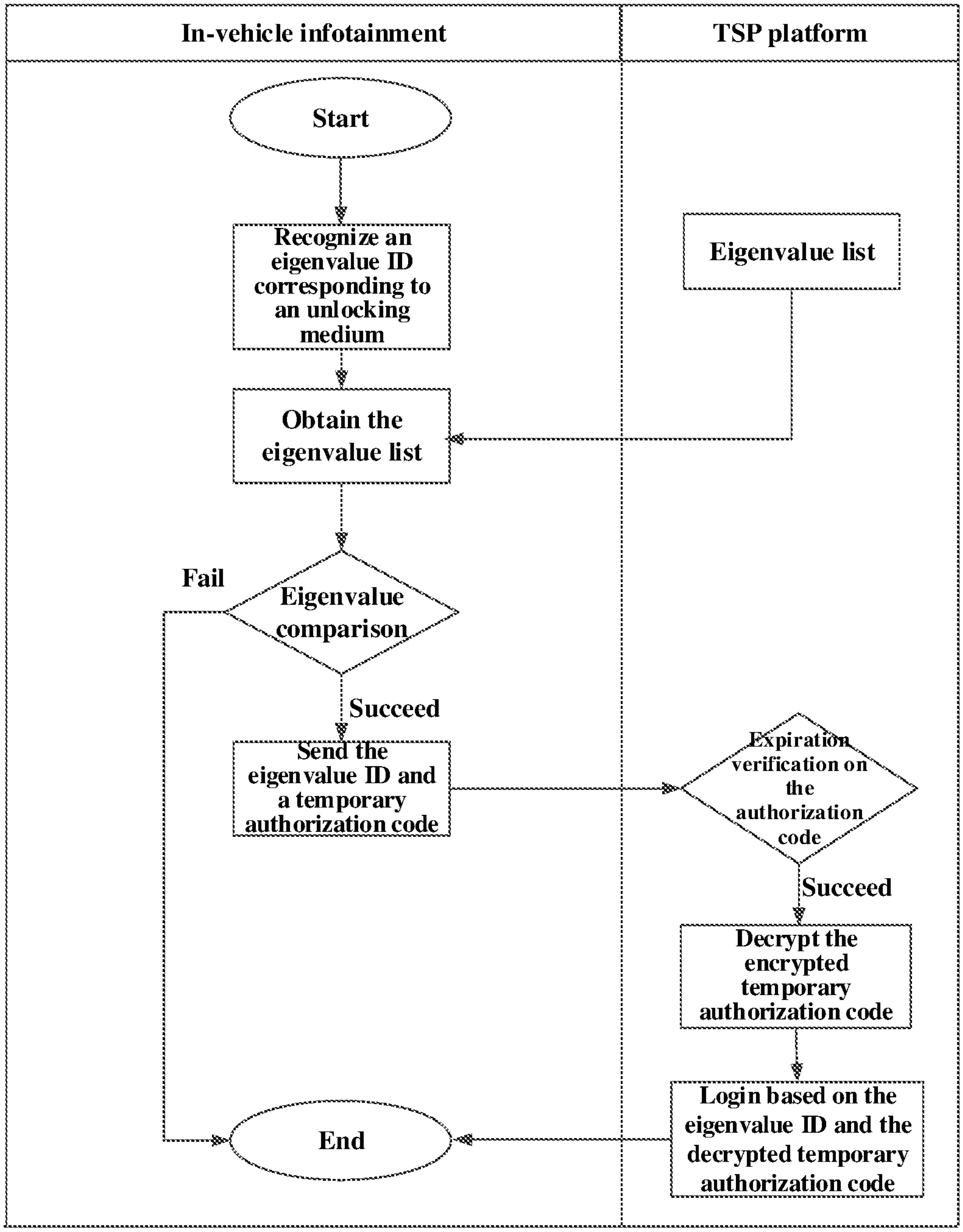
FIG. 4 is a flowchart of still another in-vehicle infotainment application login method according to an exemplary embodiment.

In some embodiments, in a login process of the in-vehicle infotainment based on an eigenvalue ID and a temporary authorization code, actions performed by the in-vehicle infotainment and the TSP platform are as shown in FIG. 4. The in-vehicle infotainment recognizes an eigenvalue ID corresponding to an unlocking medium after the user unlocks the vehicle, obtains an eigenvalue list from the TSP platform, and further performs eigenvalue comparison to determine whether the eigenvalue ID is an eigenvalue ID bound to the vehicle. Further, when eigenvalue comparison succeeds, the in-vehicle infotainment sends the eigenvalue ID and a temporary authorization code to the TSP platform. The TSP platform performs expiration checking on the temporary authorization code. When the temporary authorization code does not expire, the encrypted temporary authorization code is decrypted. Further, login to the in-vehicle infotainment is performed based on the eigenvalue ID and the decrypted temporary authorization code.

It may be understood that in the in-vehicle infotainment application login method provided in the embodiments of the present application, after the vehicle is unlocked by the user through a specific unlocking medium, the in-vehicle infotainment determines an eigenvalue ID corresponding to the unlocking medium, and obtains the target eigenvalue list corresponding to the vehicle from the TSP platform. When there is the eigenvalue ID corresponding to the unlocking medium in the target eigenvalue list, a temporary authorization code corresponding to the eigenvalue ID is obtained from the target eigenvalue list. Further, the obtained eigenvalue ID and the temporary authorization code are sent to the TSP platform. After the TSP platform successfully verifies the eigenvalue ID and the temporary authorization code again, login to the in-vehicle infotainment application is performed with an in-vehicle infotainment application account corresponding to the eigenvalue ID. In the present application, through verification of the eigenvalue ID by the in-vehicle infotainment and verification of the eigenvalue ID and the temporary authorization code by the TSP platform, unconscious login to the in-vehicle infotainment application is implemented after the user unlocks the vehicle, and security of logging in to the in-vehicle infotainment application is improved. In addition, an account and a password of the user are not cached in the in-vehicle infotainment, so that a problem of low security in unconscious login in the related art is further solved.

In some embodiments, the in-vehicle infotainment application login system further includes a server of a third-party application. After the user logs in to the in-vehicle infotainment application, unconscious login is also implemented for the third-party application that the user needs to log in to, to bring better application login experience to the user.

The in-vehicle infotainment receives a third-party application binding request initiated by the user. The third-party application binding request includes the in-vehicle infotainment application account of the user, a third-party application account, and a third-party application ID. After the third-party application account logs in to the third-party application, the third-party application binding request is sent to the server of the third-party application, so that the server of the third-party application establishes a mapping relationship between the in-vehicle infotainment application account of the user and the third-party application account.

In this case, after the in-vehicle infotainment performs login to the in-vehicle infotainment application of the vehicle based on the first eigenvalue ID and the first temporary authorization code, a third-party application list bound to the in-vehicle infotainment application account of the user is obtained. A login notification is sent to a server of each third-party application in the third-party application list, so that the server of each third-party application performs login with a third-party application account of the user. Unconscious login to the third-party application is implemented.

Figure 5:
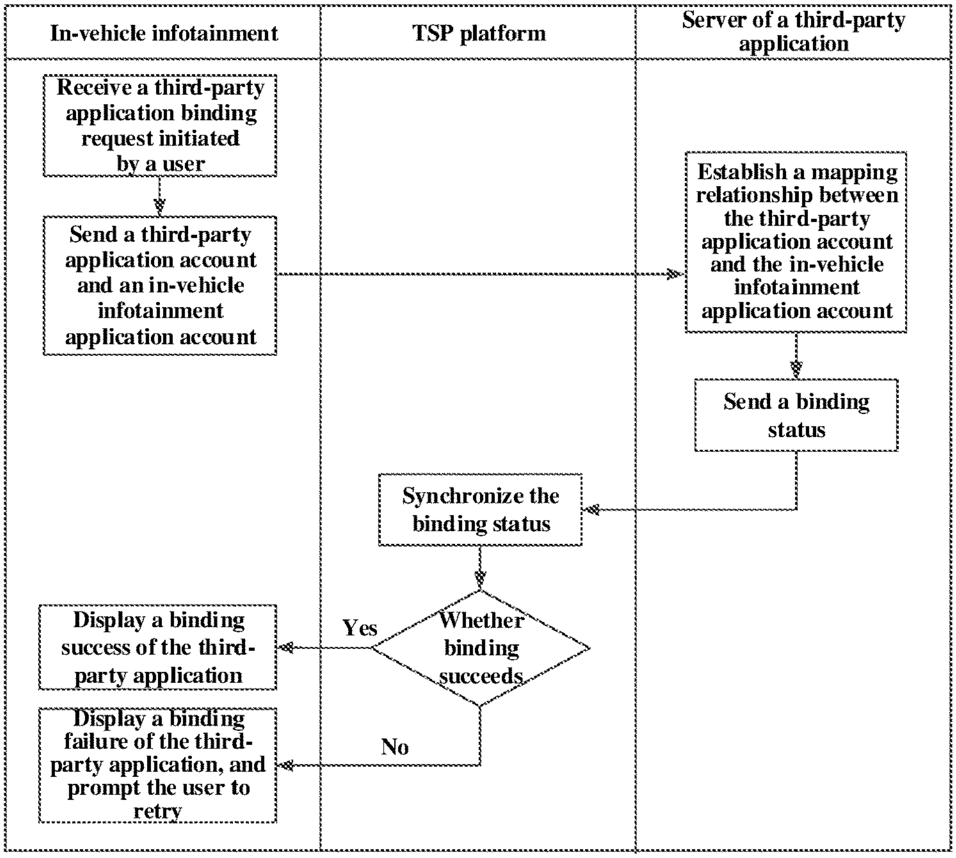
FIG. 5 is a flowchart of binding a third-party application according to an exemplary embodiment.

In some embodiments, in a third-party application binding process of the in-vehicle infotainment, actions performed by the in-vehicle infotainment, the server of the third-party application, and the TSP platform are as shown in FIG. 5. The in-vehicle infotainment receives the third-party application binding request initiated by the user. The third-party application account and the in-vehicle infotainment application account are sent to the server of the third-party application through the TSP platform. Correspondingly, the server of the third-party application establishes the mapping relationship between the third-party application account and the in-vehicle infotainment application account, and synchronizes a binding status to the TSP platform. Further, the TSP platform determines, based on the binding status synchronized by the server of the third-party application, whether binding succeeds. If binding succeeds, a binding success of the third-party application is displayed on the in-vehicle infotainment; or if binding fails, a binding failure of the third-party application is displayed on the in-vehicle infotainment, to prompt the user to retry.

Figure 6:
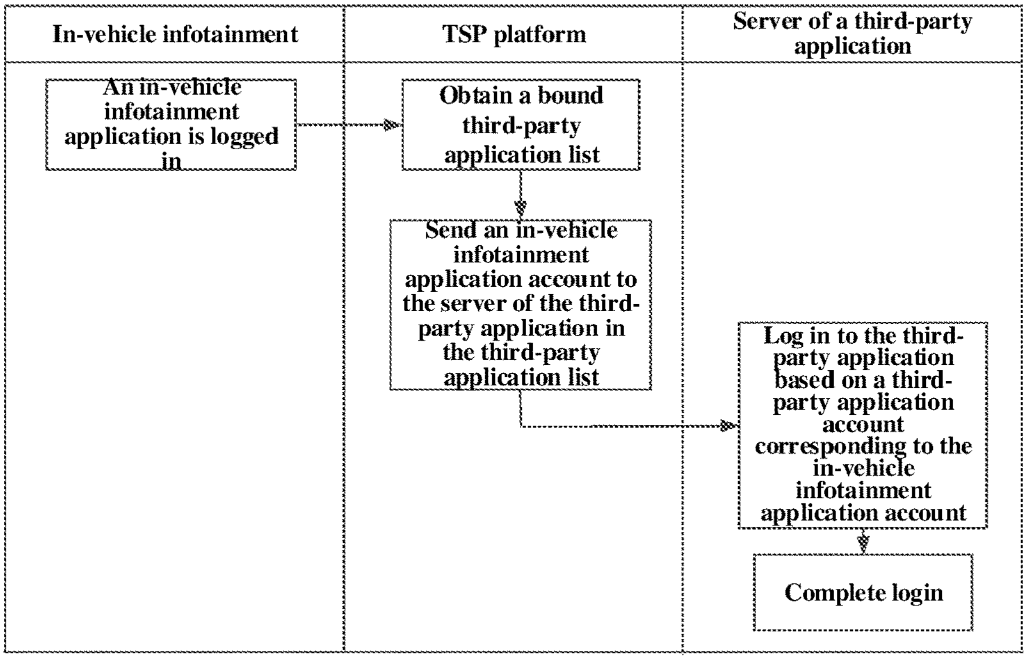
FIG. 6 is a flowchart of logging in to a third-party application according to an exemplary embodiment.

In some embodiments, in a process of logging in to the third-party application after the user logs in to the in-vehicle infotainment application, actions performed by the in-vehicle infotainment, the server of the third-party application, and the TSP platform are as shown in FIG. 6. The in-vehicle infotainment obtains the bound third-party application list from the TSP platform based on the in-vehicle infotainment application account, and further sends the in-vehicle infotainment application account to the server of each third-party application in the third-party application list to notify the server of the third-party application to perform login to the third-party application, so that the server of the corresponding third-party application performs login to the third-party application based on a third-party application account corresponding to the in-vehicle infotainment application account after receiving the in-vehicle infotainment application account.

Figure 7:
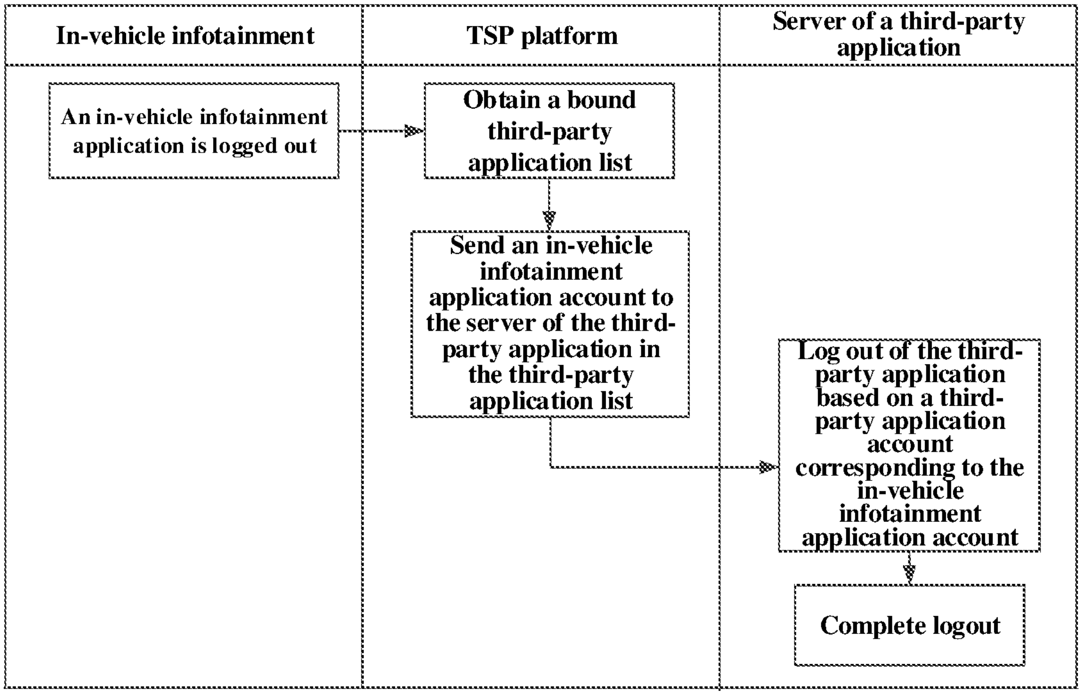
FIG. 7 is a flowchart of logging out of a third-party application according to an exemplary embodiment.

In some embodiments, in a process of logging out of the third-party application after the user logs out of the in-vehicle infotainment application, actions performed by the in-vehicle infotainment, the server of the third-party application, and the TSP platform are as shown in FIG. 7. The in-vehicle infotainment obtains the bound third-party application list from the TSP platform based on the in-vehicle infotainment application account, and further sends the in-vehicle infotainment application account to the server of each third-party application in the third-party application list to notify the server of the third-party application to perform logout of the third-party application, so that the server of the corresponding third-party application performs logout of the third-party application based on a third-party application account corresponding to the in-vehicle infotainment application account after receiving the in-vehicle infotainment application account.

Figure 8:
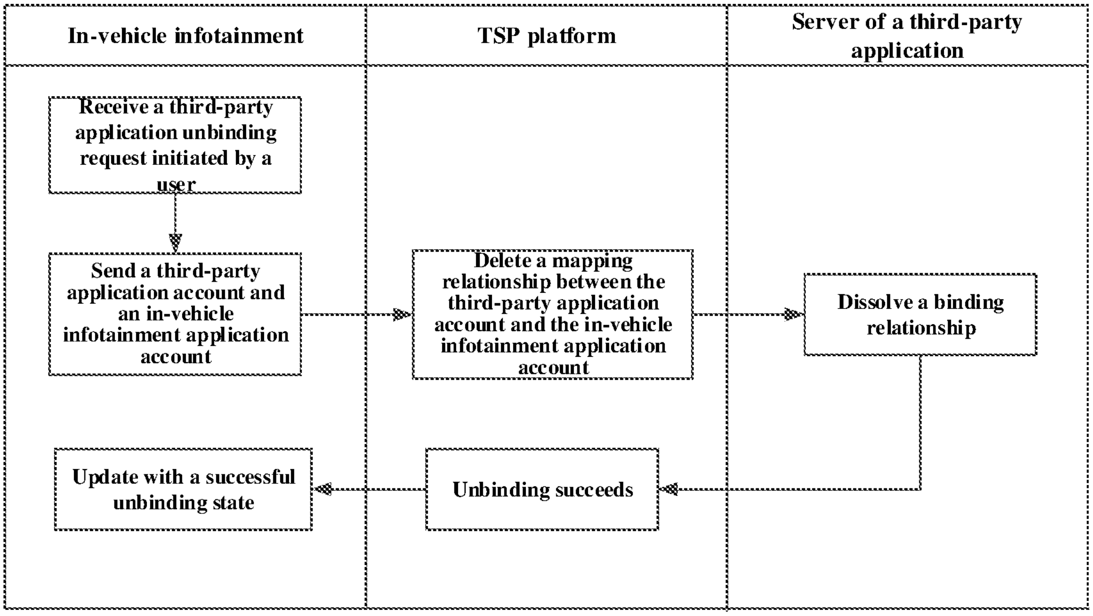
FIG. 8 is a flowchart of unbinding a third-party application according to an exemplary embodiment.

In some embodiments, in a third-party application unbinding process of the in-vehicle infotainment, actions performed by the in-vehicle infotainment, the server of the third-party application, and the TSP platform are as shown in FIG. 8. The in-vehicle infotainment receives a third-party application unbinding request initiated by the user, and sends the third-party application account and the in-vehicle infotainment application account to the TSP platform, so that the TSP platform deletes the mapping relationship between the third-party application account and the in-vehicle infotainment application account, and notifies the server of the third-party application to dissolve a binding relationship. Correspondingly, after dissolving the binding relationship between the third-party application account and the in-vehicle infotainment application account, the server of the third-party application returns unbinding success information to the TSP platform. The TSP platform forwards the unbinding success information to the in-vehicle infotainment.

Figure 9:
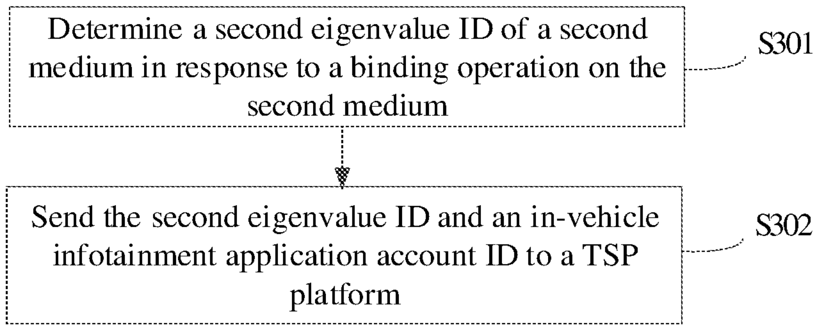
FIG. 9 is a flowchart of still another in-vehicle infotainment application login method according to an exemplary embodiment.

In a design, to implement unconscious login to the in-vehicle infotainment application, the in-vehicle infotainment needs to bind an unlocking medium to an eigenvalue ID in advance, as shown in FIG. 9, including S301 and S302.

In S301, the in-vehicle infotainment determines a second eigenvalue ID of a second medium in response to a binding operation on the second medium.

The second medium is any unlocking medium that is not bound to the in-vehicle infotainment application account of the user.

As a possible implementation, after login to the in-vehicle infotainment application, the in-vehicle infotainment prompts the user to operate the second medium for recognition in response to an unlocking medium binding operation of the user. Further, the in-vehicle infotainment recognizes the second medium in response to a recognition operation performed by the user on the second medium, and processes the recognized second medium based on a preset algorithm, to obtain an eigenvalue ID corresponding to the second medium, that is, the second eigenvalue ID.

In S302, the in-vehicle infotainment sends the second eigenvalue ID and an in-vehicle infotainment application account ID to the TSP platform.

Correspondingly, the TSP platform receives the second eigenvalue ID and the in-vehicle infotainment application account ID that are sent by the in-vehicle infotainment. The TSP platform establishes a mapping relationship between the second eigenvalue ID and the in-vehicle infotainment application account ID, and signs and issues a second temporary authorization code corresponding to the second eigenvalue ID.

Further, the TSP platform updates the stored target eigenvalue list based on the second eigenvalue ID and the second temporary authorization code.

For example, data fields sent by the in-vehicle infotainment to the TSP platform are as shown in the following Table 2.

TABLE 2

Example table of data fields

| Data keyword | Data | Data description |
|---|---|---|
| featureId | 98bea9445db9992e4b5d16da | Eigenvalue ID |
| userToken | Slkdfj123lkjsdfsdf1231 | User token, the TSP platform may obtain the in-vehicle infotainment application account ID of the user through parsing to establish a mapping relationship with the eigenvalue ID |
| featureType | FACEID | Eigenvalue type, for example, FACEID indicates an identity for face login |

Based on the data fields shown in Table 2, the TSP platform can obtain the second eigenvalue ID from a message sent by the in-vehicle infotainment and obtain, through parsing, the in-vehicle infotainment application account ID from the user token, to establish the mapping relationship to implement binding between the eigenvalue ID and the in-vehicle infotainment application account.

Figure 10:
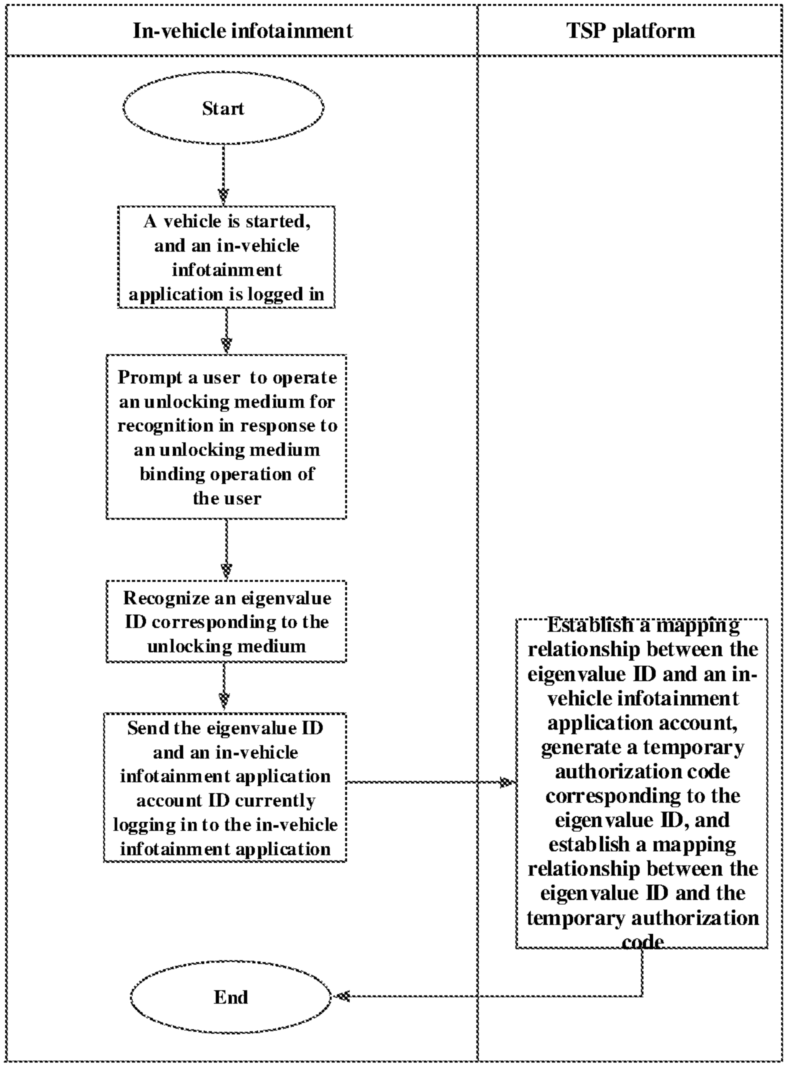
FIG. 10 is a flowchart of still another in-vehicle infotainment application login method according to an exemplary embodiment.

In some embodiments, in a binding process of the eigenvalue ID and the in-vehicle infotainment application account, actions performed by the in-vehicle infotainment and the TSP platform are as shown in FIG. 10. The vehicle is started, and login to the in-vehicle infotainment application is already implemented. The user is prompted to operate an unlocking medium for recognition in response to an unlocking medium binding operation of the user. An eigenvalue ID corresponding to the unlocking medium is recognized. Further, the recognized eigenvalue ID and an in-vehicle infotainment application account ID currently logging in to the in-vehicle infotainment application are sent to the TSP platform. Correspondingly, the TSP platform receives the eigenvalue ID and the in-vehicle infotainment application account ID, establishes a mapping relationship, generates a temporary authorization code corresponding to the eigenvalue ID, and establishes a mapping relationship between the eigenvalue ID and the temporary authorization code.

It may be understood that in the in-vehicle infotainment application login method provided in the foregoing embodiments of the present application, binding between the eigenvalue ID and the in-vehicle infotainment application account is implemented at the TSP platform, to determine the in-vehicle infotainment application account corresponding to the unlocking medium when the vehicle is unlocked again with the unlocking medium, so that unconscious login to the in-vehicle infotainment application is implemented.

Figure 11:
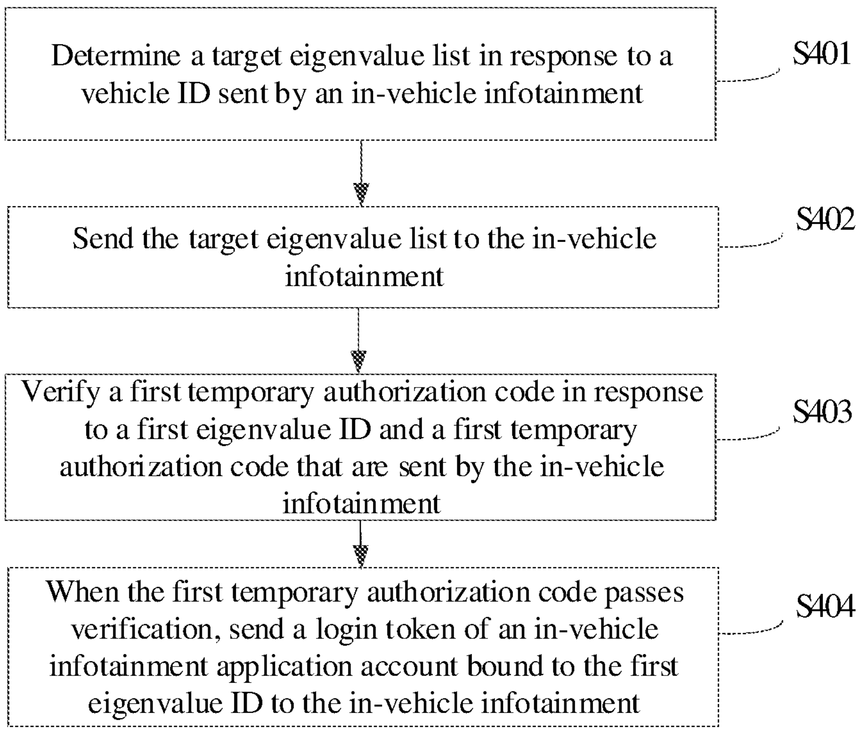
FIG. 11 is still another flowchart of binding an in-vehicle infotainment application account according to an exemplary embodiment.

FIG. 11 is a schematic flowchart of an in-vehicle infotainment application login method according to some exemplary embodiments. In some embodiments, the in-vehicle infotainment application login method may be applied to the TSP platform 12 in the in-vehicle infotainment application login system 10 shown in FIG. 2. The following describes the in-vehicle infotainment application login method in the embodiments of the present application by taking application of the in-vehicle infotainment application login method to the TSP platform 12 as an example.

As shown in FIG. 11, the in-vehicle infotainment application login method provided in the embodiments of the present application includes the following S401 to S404.

In S401, the TSP platform determines a target eigenvalue list in response to a vehicle ID sent by the in-vehicle infotainment.

The target eigenvalue list includes a plurality of eigenvalue IDs bound to a vehicle and a temporary authorization code corresponding to each of the plurality of eigenvalue IDs.

As a possible implementation, after receiving the vehicle ID sent by the in-vehicle infotainment, the TSP platform queries an eigenvalue list corresponding to the vehicle ID, and determines the eigenvalue list as the target eigenvalue list.

In S402, the TSP platform sends the target eigenvalue list to the in-vehicle infotainment.

Correspondingly, the in-vehicle infotainment determines a first temporary authorization code based on the target eigenvalue list sent by the TSP platform and a first eigenvalue ID.

The first temporary authorization code is a temporary authorization code corresponding to the first eigenvalue ID. The first eigenvalue ID is an eigenvalue ID of a first medium obtained after a user unlocks the vehicle through the first medium.

In S403, the TSP platform verifies the first temporary authorization code in response to the first eigenvalue ID and the first temporary authorization code that are sent by the in-vehicle infotainment.

As a possible implementation, the TSP platform determines validity duration of the first temporary authorization code to determine whether the first temporary authorization code expires. Further, when the first temporary authorization code does not expire, the TSP platform determines that the first temporary authorization code passes authorization.

In some embodiments, in step S402, the TSP platform encrypts the temporary authorization code in the target eigenvalue list sent to the in-vehicle infotainment. The in-vehicle infotainment does not process the temporary authorization code. After receiving the first eigenvalue ID and the encrypted first temporary authorization code that are sent by the in-vehicle infotainment, the TSP platform performs expiration verification on the first temporary authorization code, decrypts the first temporary authorization code after expiration verification succeeds, compares the decrypted first temporary authorization code with a temporary authorization code that is in a storage space and that corresponds to the first eigenvalue ID, and when comparison shows that the first temporary authorization code is consistent with the temporary authorization code that is in the storage space and that corresponds to the first eigenvalue ID, determines that the first temporary authorization code passes verification.

In S404, when the first temporary authorization code passes verification, the TSP platform sends a login token of an in-vehicle infotainment application account bound to the first eigenvalue ID to the in-vehicle infotainment.

Correspondingly, the in-vehicle infotainment performs login to an in-vehicle infotainment application of the vehicle based on the received login token.

As a possible implementation, when the first temporary authorization code passes verification, the TSP platform determines the in-vehicle infotainment application account bound to the first eigenvalue ID, further obtains the login token corresponding to the in-vehicle infotainment application account, and further sends the login token to the in-vehicle infotainment, so that the in-vehicle infotainment performs login to the in-vehicle infotainment application of the vehicle based on the login token.

Figure 12:
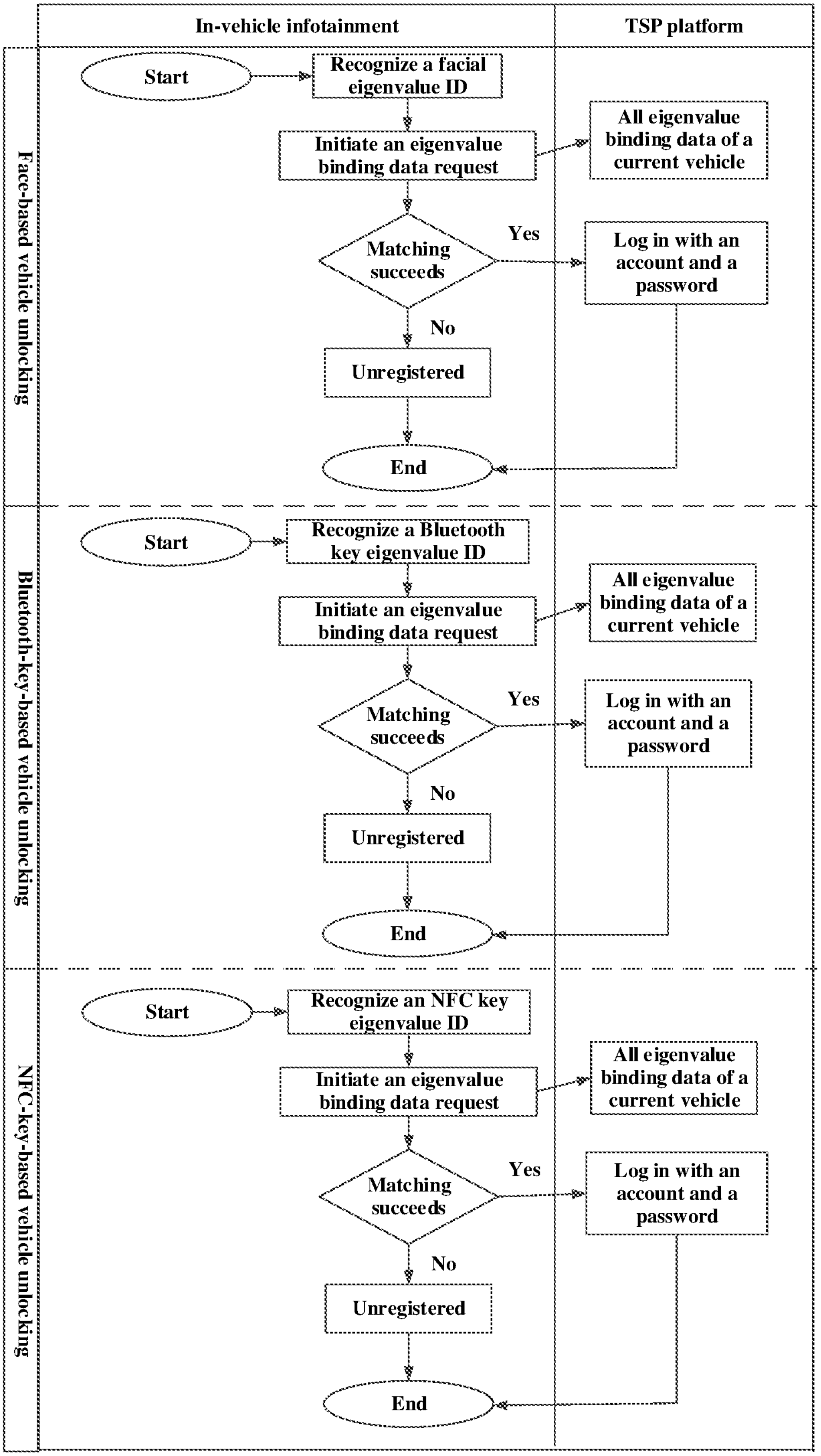
FIG. 12 is a flowchart of still another in-vehicle infotainment application login method according to an exemplary embodiment.

It may be understood that in the in-vehicle infotainment application login method provided in the embodiments of the present application, unconscious login to an application of the vehicle and automatic login and logout of an associated third-party application are implemented after the user unlocks the vehicle, and sensitive information of the user does not need to be stored in the in-vehicle infotainment, so that high security and great convenience are ensured, and better user experience is brought. In some embodiments, FIG. 12 shows an example of an in-vehicle infotainment application login process after the user unlocks the vehicle through different unlocking media. The process includes face-based unlocking, Bluetooth-key-based unlocking, and NFC-key-based unlocking. It can be learned that after the vehicle is unlocked through different unlocking media, only eigenvalue IDs of the unlocking media recognized by the recognition module in the in-vehicle infotainment application login process are different, so that applicability is high, and extension of the unlocking media by the user is facilitated.

The foregoing mainly describes the solutions provided in the embodiments of the present application from a perspective of the method. To implement the foregoing functions, an in-vehicle infotainment application login apparatus or an in-vehicle infotainment application login device includes corresponding hardware structures and/or software modules for performing the functions. A person skilled in the art should be easily aware that units and algorithm steps in the examples described with reference to the embodiments disclosed in this specification may be implemented in a form of hardware or in a form of a combination of hardware and computer software in the present application. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present application, functional module division may be exemplarily performed on the in-vehicle infotainment application login apparatus or the in-vehicle infotainment application login device based on the method. For example, the in-vehicle infotainment application login apparatus or the in-vehicle infotainment application login device may include functional modules corresponding to the functions, or two or more functions may be integrated into one processing module. The integrated module may be implemented in a form of hardware, or may be implemented in a form of a software functional module. It should be noted that module division in the embodiments of the present application is an example and is merely logical function division. During actual implementation, there may be another division manner.

Figure 13:
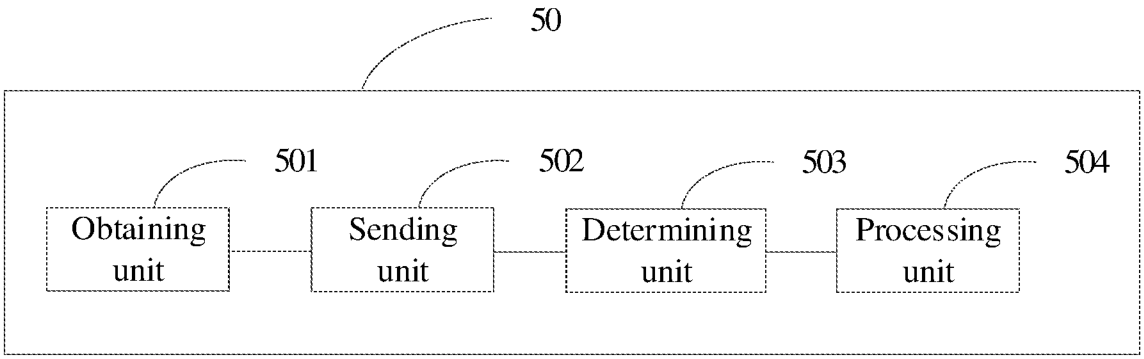
FIG. 13 is a block diagram of an in-vehicle infotainment application login apparatus according to an exemplary embodiment.

FIG. 13 is a schematic diagram of a structure of an in-vehicle infotainment application login apparatus according to an embodiment of the present application. The in-vehicle infotainment application login apparatus is configured to perform the in-vehicle infotainment application login method. As shown in FIG. 13, the in-vehicle infotainment application login apparatus 50 includes an obtaining unit 501, a sending unit 502, a determining unit 503, and a processing unit 504.

The obtaining unit 501 is configured to obtain a first eigenvalue ID of a first medium after a user unlocks a vehicle through the first medium. The first medium is any one of a plurality of unlocking media for unlocking the vehicle.

The sending unit 502 is configured to send a vehicle ID of the vehicle to the TSP platform, so that the TSP platform sends a target eigenvalue list to the in-vehicle infotainment based on the vehicle ID. The target eigenvalue list includes a plurality of eigenvalue IDs bound to the vehicle and a temporary authorization code corresponding to each of the plurality of eigenvalue IDs.

The obtaining unit 501 is further configured to obtain the target eigenvalue list sent by the TSP platform.

The determining unit 503 is configured to determine a first temporary authorization code. The first temporary authorization code is a temporary authorization code corresponding to the first eigenvalue ID.

The processing unit 504 is configured to perform login to an in-vehicle infotainment application of the vehicle based on the first eigenvalue ID and the first temporary authorization code.

Optionally, the determining unit 503 is specifically configured to: verify the first eigenvalue ID based on the plurality of eigenvalue IDs in the target eigenvalue list; and when the first eigenvalue ID passes verification with the plurality of eigenvalue IDs, determine the temporary authorization code corresponding to the first eigenvalue ID as the first temporary authorization code.

Optionally, the processing unit 504 is specifically configured to: send the first eigenvalue ID and the first temporary authorization code to the TSP platform, so that the TSP platform verifies the first temporary authorization code, and after the first temporary authorization code passes verification, returns a login token of an in-vehicle infotainment application account bound to the first eigenvalue ID; and perform login to the in-vehicle infotainment application of the vehicle in response to the login token sent by the TSP platform.

Optionally, the determining unit 503 is further configured to determine a second eigenvalue ID of a second medium in response to a binding operation on the second medium. The second medium is any unlocking medium that is not bound to the in-vehicle infotainment application account of the user.

The sending unit 502 is further configured to send the second eigenvalue ID and an in-vehicle infotainment application account ID to the TSP platform, so that the TSP platform establishes a mapping relationship between the second eigenvalue ID and the in-vehicle infotainment application account ID, and signs and issues a second temporary authorization code.

Optionally, the obtaining unit 501 is further configured to receive a third-party application binding request initiated by the user. The third-party application binding request includes the in-vehicle infotainment application account of the user, a third-party application account, and a third-party application ID.

The sending unit 502 is further configured to: after the third-party application account logs in to a third-party application, send the third-party application binding request to a server of the third-party application, so that the server of the third-party application establishes a mapping relationship between the in-vehicle infotainment application account of the user and the third-party application account.

Optionally, the obtaining unit 501 is further configured to obtain a third-party application list bound to the in-vehicle infotainment application account of the user.

The sending unit 502 is further configured to send a login notification to a server of each third-party application in the third-party application list, so that the server of each third-party application performs login with a third-party application account of the user.

Figure 14:
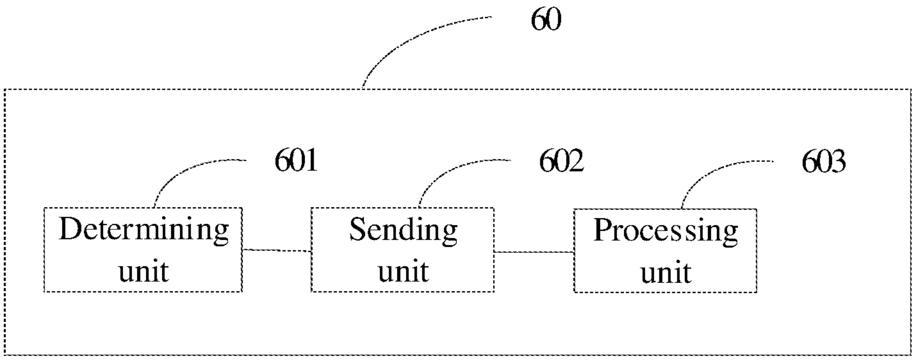
FIG. 14 is a block diagram of still another in-vehicle infotainment application login apparatus according to an exemplary embodiment.

FIG. 14 is a schematic diagram of a structure of another in-vehicle infotainment application login apparatus according to an embodiment of the present application. The in-vehicle infotainment application login apparatus is configured to perform the in-vehicle infotainment application login method. As shown in FIG. 14, the in-vehicle infotainment application login apparatus 60 includes a determining unit 601, a sending unit 602, and a processing unit 603.

The determining unit 601 is configured to determine a target eigenvalue list in response to a vehicle ID sent by the in-vehicle infotainment. The target eigenvalue list includes a plurality of eigenvalue IDs bound to the vehicle and a temporary authorization code corresponding to each of the plurality of eigenvalue IDs.

The sending unit 602 is configured to send the target eigenvalue list to the in-vehicle infotainment, so that the in-vehicle infotainment determines a first temporary authorization code. The first temporary authorization code is a temporary authorization code corresponding to a first eigenvalue ID. The first eigenvalue ID is an eigenvalue ID of a first medium obtained after a user unlocks the vehicle through the first medium.

The processing unit 603 is configured to verify the first temporary authorization code in response to the first eigenvalue ID and the first temporary authorization code that are sent by the in-vehicle infotainment.

The sending unit 602 is further configured to: when the first temporary authorization code passes verification, send a login token of an in-vehicle infotainment application account bound to the first eigenvalue ID to the in-vehicle infotainment, so that the in-vehicle infotainment performs login to an in-vehicle infotainment application of the vehicle based on the login token.

Optionally, the processing unit 603 is specifically configured to: determine whether the first temporary authorization code expires; and when the first temporary authorization code does not expire, determine that the first temporary authorization code passes authorization.

Optionally, the processing unit 603 is further configured to: in response to a second eigenvalue ID and an in-vehicle application account ID of the user that are sent by the in-vehicle infotainment, establish a mapping relationship between the second eigenvalue ID and the in-vehicle infotainment application account ID, and sign and issue a second temporary authorization code, the second eigenvalue ID being an eigenvalue ID of a second medium, and the second medium being any unlocking medium that is not bound to the in-vehicle infotainment application account of the user; and update the target eigenvalue list based on the second eigenvalue ID and the second temporary authorization code.

Figure 15:
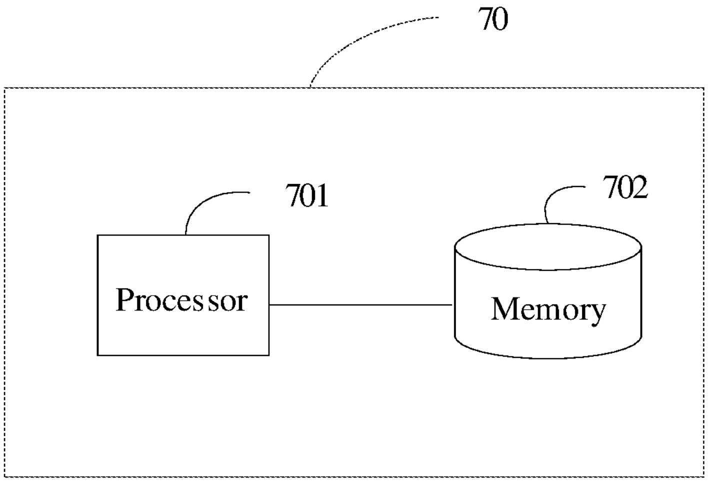
FIG. 15 is a block diagram of an in-vehicle infotainment according to an exemplary embodiment.

FIG. 15 is a block diagram of an in-vehicle infotainment according to an exemplary embodiment. As shown in FIG. 15, the in-vehicle infotainment 70 includes but is not limited to a processor 701 and a memory 702.

The memory 702 is configured to store instructions executable by the processor 701. It may be understood that the processor 701 is configured to execute the instructions, to implement the in-vehicle infotainment application login method in the foregoing embodiment.

It should be noted that a person skilled in the art can understand that the structure of the in-vehicle infotainment shown in FIG. 15 does not constitute a limitation on the in-vehicle infotainment. The in-vehicle infotainment may include more or fewer components than those shown in FIG. 15, some components may be combined, or the components may be disposed in different manners.

As a control center of the in-vehicle infotainment, the processor 701 connects each part of the entire in-vehicle infotainment by using various interfaces and lines, and executes various functions and data processing of the in-vehicle infotainment by running or executing a software program and/or a module stored in the memory 702 and invoking data stored in the memory 702, thereby monitoring the entire in-vehicle infotainment. The processor 701 may include one or more processing units. Optionally, the processor 701 may integrate an application processor and a modulation and demodulation processor. The application processor mainly processes an operating system, a user interface, an application program, and the like. The modulation and demodulation processor mainly processes wireless communication. It may be understood that the modulation and demodulation processor may not be integrated into the processor 701.

The memory 702 may be configured to store a software program and various data. The memory 702 may mainly include a program storage region and a data storage region. The program storage region may store the operating system, an application program required for at least one function (for example, a determining unit and a processing unit), and the like. In addition, the memory 702 may include a high-speed random access memory, or may include a non-volatile memory, for example, at least one magnetic disk storage device, a flash memory device, or other volatile solid-state storage devices.

An exemplary embodiment further provides a computer-readable storage medium including instructions, for example, the memory 702 including instructions. The instructions may be executed by the processor 701 of the in-vehicle infotainment 70 to implement the in-vehicle infotainment application login method in the foregoing embodiment.

During actual implementation, functions of the obtaining unit 501, the sending unit 502, the determining unit 503, and the processing unit 504 in FIG. 13 may be implemented by the processor 701 in FIG. 15 by invoking the computer program stored in the memory 702. For a specific execution process, refer to the descriptions of the in-vehicle infotainment application login method in the foregoing embodiment. Details are not described herein again.

Optionally, the computer-readable storage medium may be a non-transitory computer-readable storage medium. For example, the non-transitory computer-readable storage medium may be a read-only memory (ROM), a random access memory (RAM), a compact disc read-only memory (CD-ROM), a magnetic tape, a floppy disk, or an optical data storage device.

In an exemplary embodiment, an embodiment of the present application further provides a vehicle including the in-vehicle infotainment.

In an exemplary embodiment, an embodiment of the present application further provides a computer program product including one or more instructions. The one or more instructions may be executed by the processor 701 of the in-vehicle infotainment to implement the in-vehicle infotainment application login method in the foregoing embodiment.

It should be noted that when the instructions in the computer-readable storage medium or the one or more instructions in the computer program product are executed by the processor of the in-vehicle infotainment, each process in the embodiment of the in-vehicle infotainment application login method is implemented, with the same technical effects as the in-vehicle infotainment application login method achieved. Details are not described herein again, to avoid repetitions.

Based on the foregoing descriptions of the implementations, a person skilled in the art may clearly understand that for ease and brevity of description, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

In the several embodiments provided in the present application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of the present application may be integrated into one processing unit, each of the units may exist alone physically, or two or more units are integrated into one unit. The integrated unit may be implemented in a hardware form or in a form of a software functional unit.

When the integrated unit is implemented in the form of a software functional unit and is sold or used as an independent product, the integrated unit may be stored in a readable storage medium. Based on such an understanding, the technical solutions in the embodiments of the present application essentially, the part contributing to the prior art, or all or a part of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of the present application. The foregoing storage medium includes any medium capable of storing program code, such as a USB flash drive, a removable hard disk, a ROM, a RAM, a magnetic disk, or an optical disc.

The foregoing descriptions are merely specific implementations of the present application, but are not intended to limit the protection scope of the present application. Therefore, the protection scope of the present application shall be subject to the protection scope of the claims.

The invention claimed is:

1. An in-vehicle infotainment application login method, characterized in that the method is applied to an in-vehicle infotainment, the in-vehicle infotainment is deployed in an in-vehicle infotainment application login system, the in-vehicle infotainment application login system further comprises a telematics service provider (TSP) platform, and the method comprises:

obtaining a first eigenvalue identity (ID) of a first medium after a user unlocks a vehicle through the first medium, the first medium being any one of a plurality of unlocking media for unlocking the vehicle;

sending a vehicle ID of the vehicle to the TSP platform, so that the TSP platform sends a target eigenvalue list to the in-vehicle infotainment based on the vehicle ID, the target eigenvalue list comprising a plurality of eigenvalue IDs bound to the vehicle and a plurality of temporary authorization codes corresponding to the plurality of eigenvalue IDs respectively;

obtaining the target eigenvalue list sent by the TSP platform, and determining a first temporary authorization code, the first temporary authorization code corresponding to the first eigenvalue ID; and performing login to an in-vehicle infotainment application of the vehicle based on the first eigenvalue ID and the first temporary authorization code.

2. The in-vehicle infotainment application login method according to claim 1, characterized in that the determining a first temporary authorization code comprises:

verifying the first eigenvalue ID based on the plurality of eigenvalue IDs in the target eigenvalue list; and when the first eigenvalue ID passes verification with the plurality of eigenvalue IDs, determining the temporary authorization code corresponding to the first eigenvalue ID as the first temporary authorization code.

3. The in-vehicle infotainment application login method according to claim 1, characterized in that the performing login to an in-vehicle infotainment application of the vehicle based on the first eigenvalue ID and the first temporary authorization code comprises:

sending the first eigenvalue ID and the first temporary authorization code to the TSP platform, so that the TSP platform verifies the first temporary authorization code, and after the first temporary authorization code passes verification, returns a login token of an in-vehicle infotainment application account bound to the first eigenvalue ID; and performing login to the in-vehicle infotainment application of the vehicle in response to the login token sent by the TSP platform.

4. The in-vehicle infotainment application login method according to claim 1, characterized by further comprising:

determining a second eigenvalue ID of a second medium in response to a binding operation on the second medium, the second medium being any unlocking medium that is not bound to an in-vehicle infotainment application account of the user; and sending the second eigenvalue ID and an in-vehicle infotainment application account ID to the TSP platform, so that the TSP platform establishes a mapping relationship between the second eigenvalue ID and the in-vehicle infotainment application account ID, and signs and issues a second temporary authorization code.

5. The in-vehicle infotainment application login method according to claim 1, characterized in that the in-vehicle infotainment application login system further comprises a server of a third-party application, and the method further comprises:

receiving a third-party application binding request initiated by the user, the third-party application binding request comprising an in-vehicle infotainment application account of the user, a third-party application account, and a third-party application ID; and after the third-party application account logs in to the third-party application, sending the third-party application binding request to the server of the third-party application, so that the server of the third-party application establishes a mapping relationship between the in-vehicle infotainment application account of the user and the third-party application account.

6. The in-vehicle infotainment application login method according to claim 5, characterized in that after the performing login to an in-vehicle infotainment application of the vehicle based on the first eigenvalue ID and the first temporary authorization code, the method further comprises:

obtaining a third-party application list bound to the in-vehicle infotainment application account of the user; and sending a login notification to a server of each third-party application in the third-party application list, so that the server of each third-party application performs login with the third-party application account of the user.

7. An in-vehicle infotainment application login method, characterized in that the method is applied to a telematics service provider (TSP) platform, the TSP platform is deployed in an in-vehicle infotainment application login system, the in-vehicle infotainment application login system further comprises an in-vehicle infotainment disposed in a vehicle, and the method comprises:

determining a target eigenvalue list in response to a vehicle identity (ID) sent by the in-vehicle infotainment, the target eigenvalue list comprising a plurality of eigenvalue IDs bound to the vehicle and a temporary authorization code corresponding to each of the plurality of eigenvalue IDs;

sending the target eigenvalue list to the in-vehicle infotainment, so that the in-vehicle infotainment determines a first temporary authorization code, the first temporary authorization code being a temporary authorization code corresponding to a first eigenvalue ID, and the first eigenvalue ID being an eigenvalue ID of a first medium obtained after a user unlocks the vehicle through the first medium;

verifying the first temporary authorization code in response to the first eigenvalue ID and the first temporary authorization code that are sent by the in-vehicle infotainment; and when the first temporary authorization code passes verification, sending a login token of an in-vehicle infotainment application account bound to the first eigenvalue ID to the in-vehicle infotainment, so that the in-vehicle infotainment performs login to an in-vehicle infotainment application of the vehicle based on the login token.

8. The in-vehicle infotainment application login method according to claim 7, characterized in that the verifying the first temporary authorization code comprises:

determining whether the first temporary authorization code expires; and when the first temporary authorization code does not expire, determining that the first temporary authorization code passes authorization.

9. The in-vehicle infotainment application login method according to claim 7, characterized by further comprising:

in response to a second eigenvalue ID and an in-vehicle application account ID of the user that are sent by the in-vehicle infotainment, establishing a mapping relationship between the second eigenvalue ID and the in-vehicle infotainment application account ID, and signing and issuing a second temporary authorization code, the second eigenvalue ID being an eigenvalue ID of a second medium, and the second medium being any unlocking medium that is not bound to the in-vehicle infotainment application account of the user; and updating the target eigenvalue list based on the second eigenvalue ID and the second temporary authorization code.

10. An in-vehicle infotainment, characterized in that the in-vehicle infotainment is deployed in a vehicle, and comprises a memory and a processor;

the memory is coupled to the processor;

the memory is configured to store computer program code, and the computer program code comprises computer instructions; and when the processor executes the computer instructions, the in-vehicle infotainment performs;

obtaining a first eigenvalue identity (ID) of a first medium after a user unlocks the vehicle through the first medium, the first medium being any one of a plurality of unlocking media for unlocking the vehicle;

sending a vehicle ID of the vehicle to a telematics service provider (TSP) platform, so that the TSP platform sends a target eigenvalue list to the in-vehicle infotainment based on the vehicle ID, the target eigenvalue list comprising a plurality of eigenvalue IDs bound to the vehicle and a plurality of temporary authorization codes corresponding to the plurality of eigenvalue IDs respectively;

obtaining the target eigenvalue list sent by the TSP platform, and determining a first temporary authorization code, the first temporary authorization code corresponding to the first eigenvalue ID; and performing login to an in-vehicle infotainment application of the vehicle based on the first eigenvalue ID and the first temporary authorization code.

11. A non-statutory computer-readable storage medium having instructions stored therein, characterized in that when the instructions run on an in-vehicle infotainment, the in-vehicle infotainment is enabled to perform:

obtaining a first eigenvalue identity (ID) of a first medium after a user unlocks a vehicle through the first medium, the first medium being any one of a plurality of unlocking media for unlocking the vehicle;

sending a vehicle ID of the vehicle to a telematics service provider (TSP) platform, so that the TSP platform sends a target eigenvalue list to the in-vehicle infotainment based on the vehicle ID, the target eigenvalue list comprising a plurality of eigenvalue IDs bound to the vehicle and a plurality of temporary authorization codes corresponding to the plurality of eigenvalue IDs respectively;

obtaining the target eigenvalue list sent by the TSP platform, and determining a first temporary authorization code, the first temporary authorization code corresponding to the first eigenvalue ID; and performing login to an in-vehicle infotainment application of the vehicle based on the first eigenvalue ID and the first temporary authorization code.

* * * * *